US009366305B2

(12) United States Patent
Yamato et al.

(10) Patent No.: US 9,366,305 B2
(45) Date of Patent: Jun. 14, 2016

(54) HYDROSTATIC FLUID GUIDE DEVICE

(71) Applicant: JTEKT Corporation, Osaka-shi (JP)

(72) Inventors: Hiroki Yamato, Kariya (JP); Yoshiaki Ando, Chiryu (JP); Masayuki Takeshima, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 141 days.

(21) Appl. No.: 14/093,140

(22) Filed: Nov. 29, 2013

(65) Prior Publication Data

US 2014/0158855 A1   Jun. 12, 2014

(30) Foreign Application Priority Data

Dec. 10, 2012   (JP) .................................. 2012-269315

(51) Int. Cl.
*F16F 9/00* (2006.01)
*F16F 9/10* (2006.01)
*F16C 29/02* (2006.01)

(52) U.S. Cl.
CPC ............... *F16F 9/103* (2013.01); *F16C 29/025* (2013.01)

(58) Field of Classification Search
USPC .............. 248/560, 562, 636, 638; 267/140.11
See application file for complete search history.

(56) References Cited

U.S. PATENT DOCUMENTS

| 3,251,633 | A |   | 5/1966  | Mohsin |           |
|-----------|---|---|---------|--------|-----------|
| 3,625,321 | A | * | 12/1971 | Lutz   | 188/298   |
| 5,501,434 | A | * | 3/1996  | McGuire| 267/140.11|
| 6,092,795 | A | * | 7/2000  | McGuire| 267/140.11|

FOREIGN PATENT DOCUMENTS

| EP | 0 099 180 A2 | 1/1984  |
| JP | 2006-266287  | 10/2006 |
| JP | 2007-90459   | 4/2007  |

OTHER PUBLICATIONS

Extended European Search Report issued Mar. 27, 2014 in Patent Application No. 13195603.9

* cited by examiner

*Primary Examiner* — Steven Marsh
(74) *Attorney, Agent, or Firm* — Oblon, McClelland, Maier & Neustadt, L.L.P

(57) ABSTRACT

In a hydrostatic fluid guide device, a damping mechanism is provided. A fluid is supplied to the damping mechanism by a hydrostatic pressure caused by natural fall, instead of being pressurized and supplied. Thus, it is possible to suppress a decrease in the pressure of the fluid in a hydrostatic fluid guide mechanism, and to position a movable body with high accuracy by setting rigidity for load support during linear movement of the movable body to a value substantially equal to a design value.

9 Claims, 8 Drawing Sheets

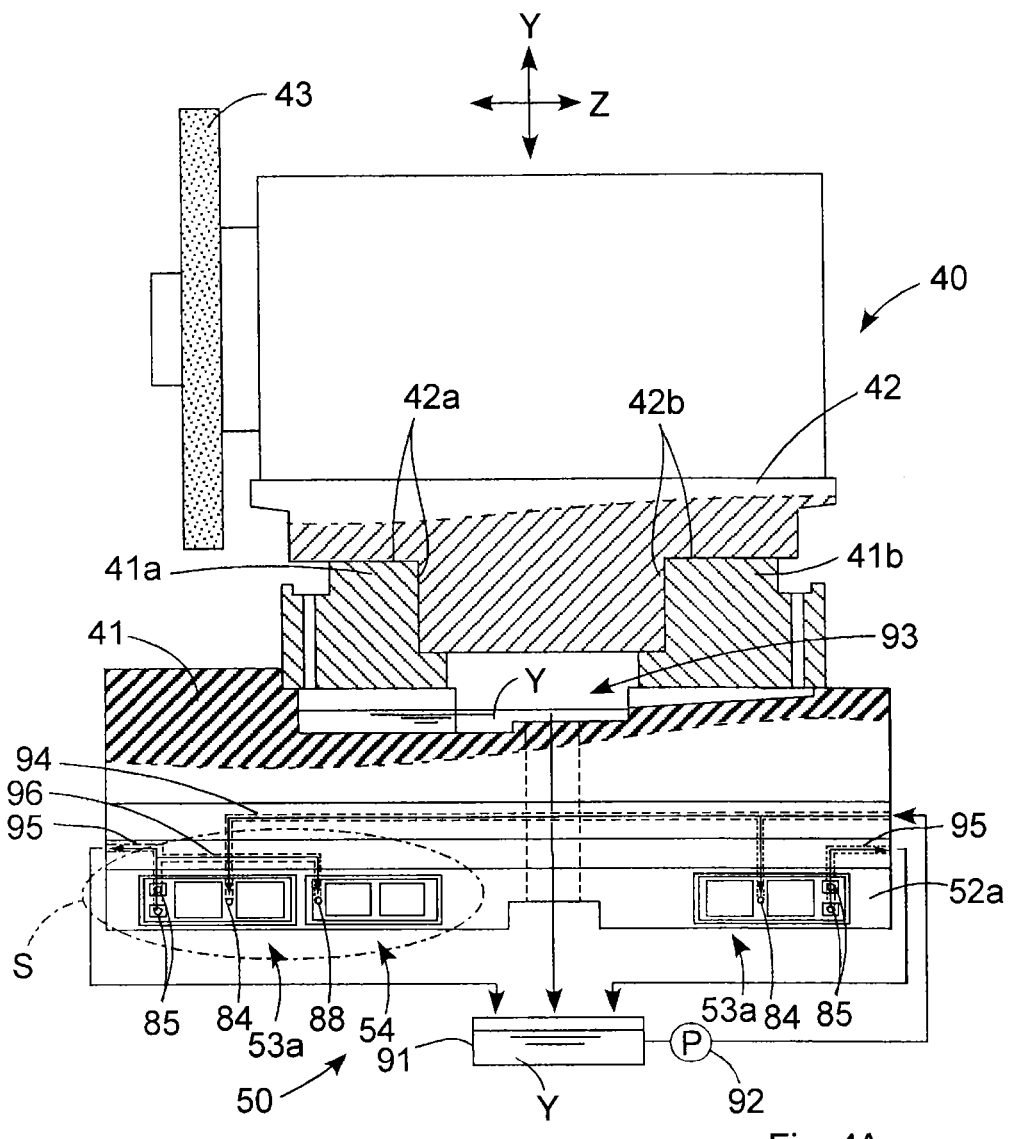
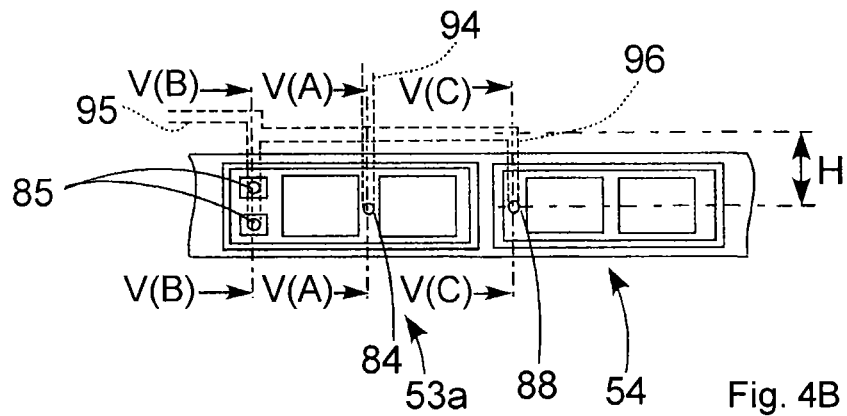
Fig. 4A
Fig. 4B

HYDROSTATIC FLUID GUIDE DEVICE

INCORPORATION BY REFERENCE/RELATED APPLICATION

This application claims priority to Japanese Patent Application No. 2012-269315 filed on Dec. 10, 2012 the disclosure of which, including the specification, drawings and abstract, is incorporated herein by reference in its entirety.

BACKGROUND OF THE INVENTION

1. Field of the Invention

The invention relates to a hydrostatic fluid guide device in which a fluid is supplied to a hydrostatic fluid guide mechanism provided in a movable body, to guide linear movement of the movable body with respect to a support.

2. Discussion of Background

For example, Japanese Patent Application Publication No. 2006-266287 (JP 2006-266287 A) describes a hydrostatic fluid guide device including a hydrostatic fluid guide mechanism in which a recessed pocket is provided in a movable body (moving body), a protruding land portion is provided inside this pocket, and a radial groove is provided in this land portion. In this hydrostatic fluid guide device, it is possible to make the pressure of oil inside the pocket uniform, and to obtain desired rigidity for load support and desired damping performance against vibration during the linear movement of the movable body on the support. Such a hydrostatic fluid guide device can be applied to, for example, a six-surface constraint guide supporting device in a sliding body of a machine tool described in Japanese Patent Application Publication No. 2007-90459 (JP 2007-90459 A).

In the hydrostatic fluid guide device in related art, in order to improve slidability with respect to the support during the linear movement of the movable body, high-viscosity oil is used as the oil supplied to the hydrostatic fluid guide mechanism. However, there is a problem that power required during the linear movement of the movable body becomes large. In order to make the power required during the linear movement of the movable body small, low-viscosity oil may be used as the oil supplied to the hydrostatic fluid guide mechanism. In this case, however, the damping performance against vibration during the linear movement of the movable body may deteriorate, and when the hydrostatic fluid guide device is applied to a machine tool, the properties of a machined surface may deteriorate.

SUMMARY OF THE INVENTION

The invention provides a hydrostatic fluid guide device in which power consumption during linear movement of a movable body with respect to a support can be reduced, and damping performance against vibration can be enhanced.

According to a feature of an example of the invention, there is provided a hydrostatic fluid guide device including: a movable body; a support that supports the movable body so that the movable body is linearly movable; a hydrostatic fluid guide mechanism that is provided in the movable body, and that guides linear movement of the movable body; and a damping mechanism that is provided in the movable body, and that damps vibration caused in the movable body, wherein a pressure of a fluid supplied to the damping mechanism is a hydrostatic pressure.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4A is a partial sectional side view showing paths of oil for the grinding wheel supporting device and the hydrostatic fluid guide device in a first form;

FIG. 4B is a view showing a portion of a hydrostatic fluid guide mechanism and a damping mechanism, the portion being indicated by S in FIG. 4A;

DETAILED DESCRIPTION OF EMBODIMENTS

Hereinafter, embodiments of the invention will be described with reference to the accompanying drawings.

A grinding machine including a hydrostatic fluid guide device according to an embodiment of the invention will be described with reference to the drawings. As an example of the grinding machine of the present embodiment, a grinding wheel head traverse type cylindrical grinding machine capable of grinding a cylindrical workpiece will be described as an example. The traverse direction is defined as a Z-axis direction, the horizontal direction perpendicular to the traverse direction is defined as an X-axis direction, and the vertical direction perpendicular to the traverse direction is defined as a Y-axis direction.

Figure 1:
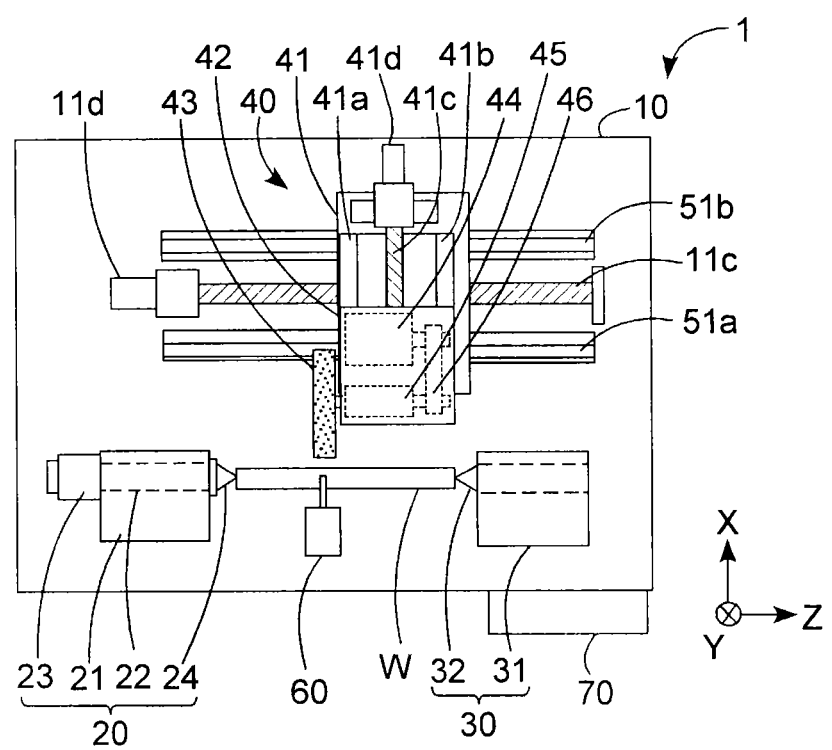
FIG. 1 is a plan view showing a grinding machine including a hydrostatic fluid guide device according to an embodiment of the present invention.

As shown in FIG. 1, a grinding machine 1 is constituted by a bed 10, a work head 20, a foot stock 30, a grinding wheel supporting device 40, a hydrostatic fluid guide device 50 (refer to FIG. 3), an in-process gauge 60, a control device 70, and the like. Although described below in detail, the hydrostatic fluid guide device 50 is configured so as to be capable of guiding the movement of the grinding wheel supporting device 40 in the Z-axis direction on the bed 10, using the squeeze effect of oil, that is, the effect in which the pressure of oil between the hydrostatic fluid guide device 50 and the grinding wheel supporting device 40 increases when the distance therebetween becomes small.

The bed 10 is substantially rectangular, and is arranged above a floor. However, the shape of the bed 10 is not limited to the rectangular shape. On an upper surface of the bed 10, a V guide rail 51a (corresponding to a "support" of the invention) for a grinding wheel head and a flat guide rail 51b for a grinding wheel head are arranged and fixed so as to extend in the Z-axis direction and be parallel to each other. A grinding wheel head traverse base 41 constituting the grinding wheel supporting device 40 is slidable on the V guide rail 51a for a grinding wheel head and the flat guide rail 51b for a grinding wheel head. Moreover, between the V guide rail 51a for a grinding wheel head and the flat guide rail 51b for a grinding wheel head on the upper surface of the bed 10, a Z-axis ball screw 11c for a grinding wheel head for driving the grinding wheel head traverse base 41 in the Z-axis direction is arranged and a Z-axis motor 11d for a grinding wheel head that rotationally drives the Z-axis ball screw 11c for a grinding wheel head is arranged and fixed. The Z-axis motor 11d for a grinding wheel head is provided with an encoder capable of detecting the rotation angle of the Z-axis motor 11d for a grinding wheel head.

The work head 20 includes a work head body 21, a work spindle 22, a work spindle motor 23, a work head center 24, and the like. The work spindle 22 is rotatably inserted through and supported by the work head body 21. The work head body 21 is fixed to the upper surface of the bed 10 so that the axial direction of the work spindle 22 is directed to the Z-axis direction and so that the work body 21 becomes parallel to the V guide rail 51a for a grinding wheel head and the flat guide rail 51b for a grinding wheel head. The work spindle motor 23 is provided at a left end of the work spindle 22, and the work spindle 22 is rotationally driven around the Z-axis with respect to the work head body 21 by the work spindle motor 23. The work spindle motor 23 is provided with an encoder capable of detecting the rotation angle of the work spindle motor 23. The work head center 24 that supports one end of a cylindrical workpiece W in the axial direction is fitted to a right end of the work spindle 22.

The foot stock 30 includes a foot stock body 31, a foot stock center 32, and the like. The foot stock center 32 is rotatably inserted through and supported by the foot stock body 31. The foot stock body 31 is fixed to the upper surface of the bed 10 so that the axial direction of the foot stock center 32 is directed to the Z-axis direction and so that the rotation axis of the foot stock center 32 is coaxial with the rotation axis of the work spindle 22. That is, the foot stock center 32 is arranged so that the foot stock center 32 and the work head center 24 support respective ends of the workpiece W in the axial direction and so that the foot stock center 32 is rotatable around the Z-axis. The foot stock center 32 is configured so that a protruding amount, by which the foot stock center 31 protrudes from a right end surface of the foot stock body 31, can be changed according to the length of the workpiece W.

The in-process gauge 60 measures the outside diameter of the workpiece W at a ground portion. A signal measured by the in-process gauge 60 is output to the control device 70. The control device 70 controls the respective motors to cause the workpiece W and a grinding wheel 43 to rotate around the Z-axis and cause the grinding wheel 43 to move in the Z-axis direction and the X-axis direction relative to the workpiece W, thereby performing the grinding of an outer peripheral surface of the workpiece W.

Figure 2:
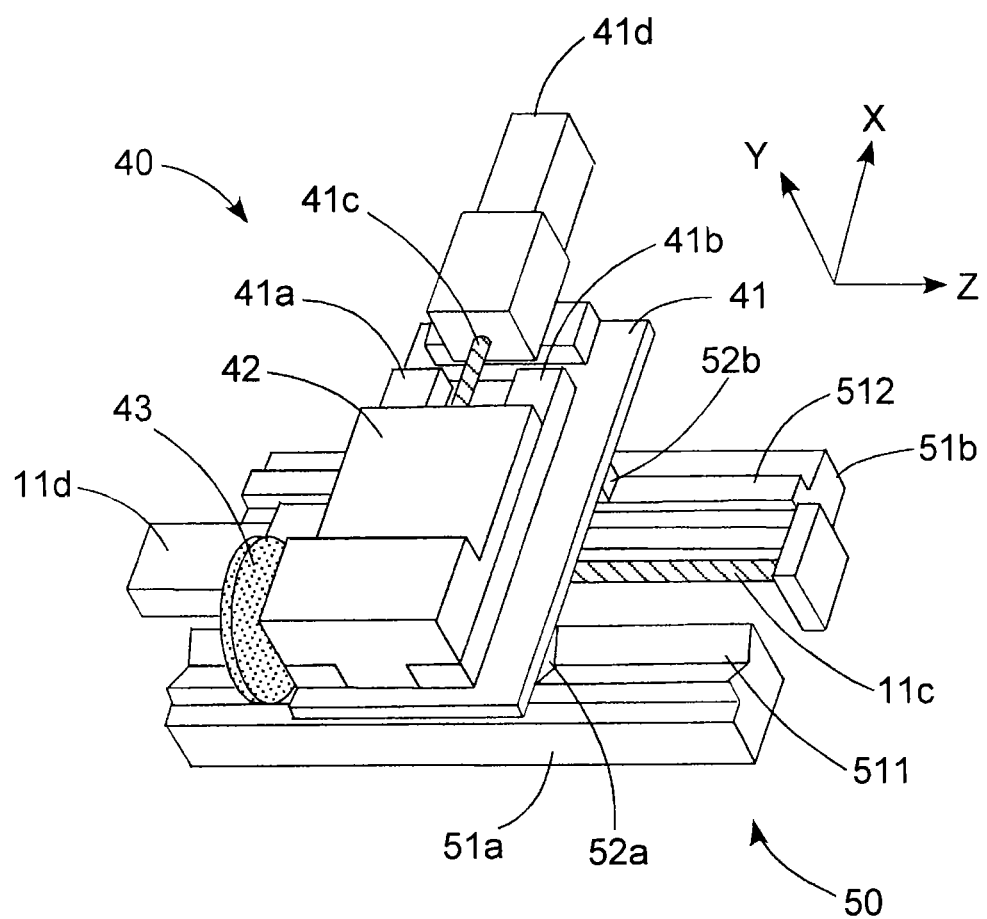
FIG. 2 is a perspective view showing a grinding wheel supporting device and a hydrostatic fluid guide device in the grinding machine.

As shown in FIGS. 1 and 2, the grinding wheel supporting device 40 includes the grinding wheel head traverse base 41, the grinding wheel head 42, the grinding wheel 43, a grinding wheel rotating motor 44, and the like. The grinding wheel head traverse base 41 is formed in the shape of a rectangular flat plate. The grinding wheel head traverse base 41 is arranged so as to be slidable on the V guide rail 51a for a grinding wheel head and the flat guide rail 51b for a grinding wheel head on the upper surface of the bed 10. That is, a V slider 52a (corresponding to a "movable body" of the invention) slidable on the V guide rail 51a for a grinding wheel head and a flat slider 52b slidable on the flat guide rail 51b for a grinding wheel head are provided on a lower surface side of the grinding wheel head traverse base 41.

The V slider 52a is formed in the shape of a triangular column, and is arranged so as to be slidable along a groove 511 that is formed in the V guide rail 51a for a grinding wheel head and has a V-shaped section. That is, the V slider 52a is provided with two sliding surfaces 521 formed in a V shape so that the V slider 52a is slidable along the V-shaped groove 511 (refer to FIG. 3). Additionally, the flat slider 52b is formed in the shape of a rectangular parallelepiped, and is arranged so as to be slidable along an upper flat surface 512 of the flat guide rail 51b for a grinding wheel head. That is, the flat slider 52b is provided with a sliding surface 522 formed to be flat so that the flat slider 52b is slidable along the upper flat surface 512 (refer to FIG. 3).

The grinding wheel head traverse base 41 is coupled to a nut member of the Z-axis ball screw 11c for a grinding wheel head, and is driven and moved along the V guide rail 51a for a grinding wheel head and the flat guide rail 51b for a grinding wheel head, by the Z-axis motor 11d for a grinding wheel head. The Z-axis motor 11d for a grinding wheel head is provided with an encoder that detects the rotation angle of the Z-axis motor 11d for a grinding wheel head.

Paired X-axis guide rails 41a and 41b for a grinding wheel head on which the grinding wheel head 42 is slidable are arranged and fixed on an upper surface of the grinding wheel head traverse base 41 so as to extend in the X-axis direction and be parallel to each other. Moreover, between the X-axis guide rails 41a and 41b for a grinding wheel head on the upper surface of the grinding wheel head traverse base 41, an X-axis ball screw 41c for a grinding wheel head for driving the grinding wheel head 42 in the X-axis direction is arranged and an X-axis motor 41d for a grinding wheel head that rotationally drives the X-axis ball screw 41c for a grinding wheel head is arranged. The X-axis motor 41d for a grinding wheel head is provided with an encoder that detects the rotation angle of the X-axis motor 41d for a grinding wheel head.

The grinding wheel head 42 is arranged so as to be slidable on the X-axis guide rails 41a and 41b for a grinding wheel head on the upper surface of the grinding wheel head traverse base 41 for a grinding wheel head. The grinding wheel head 42 is coupled to a nut member of the X-axis ball screw 41c for a grinding wheel head, and is driven and moved along the X-axis guide rails 41a and 41b for a grinding wheel head, by the X-axis motor 41d for a grinding wheel head. That is, the grinding wheel head 42 is configured so as to be movable in the X-axis direction and the Z-axis direction relative to the bed 10, the work head 20, and the foot stock 30.

A grinding wheel rotary shaft member 45 is supported by the grinding wheel head 42 so as to be rotatable around the Z-axis. The disk-shaped grinding wheel 43 is coaxially fitted to one end of the grinding wheel rotary shaft member 45. The grinding wheel rotating motor 44 is fixed to an upper surface of the grinding wheel head 42. The rotation of the grinding wheel rotating motor 44 is transmitted to the grinding wheel rotary shaft member 45 via a belt pulley mechanism 46, whereby the grinding wheel 43 is rotationally driven.

Figure 3:
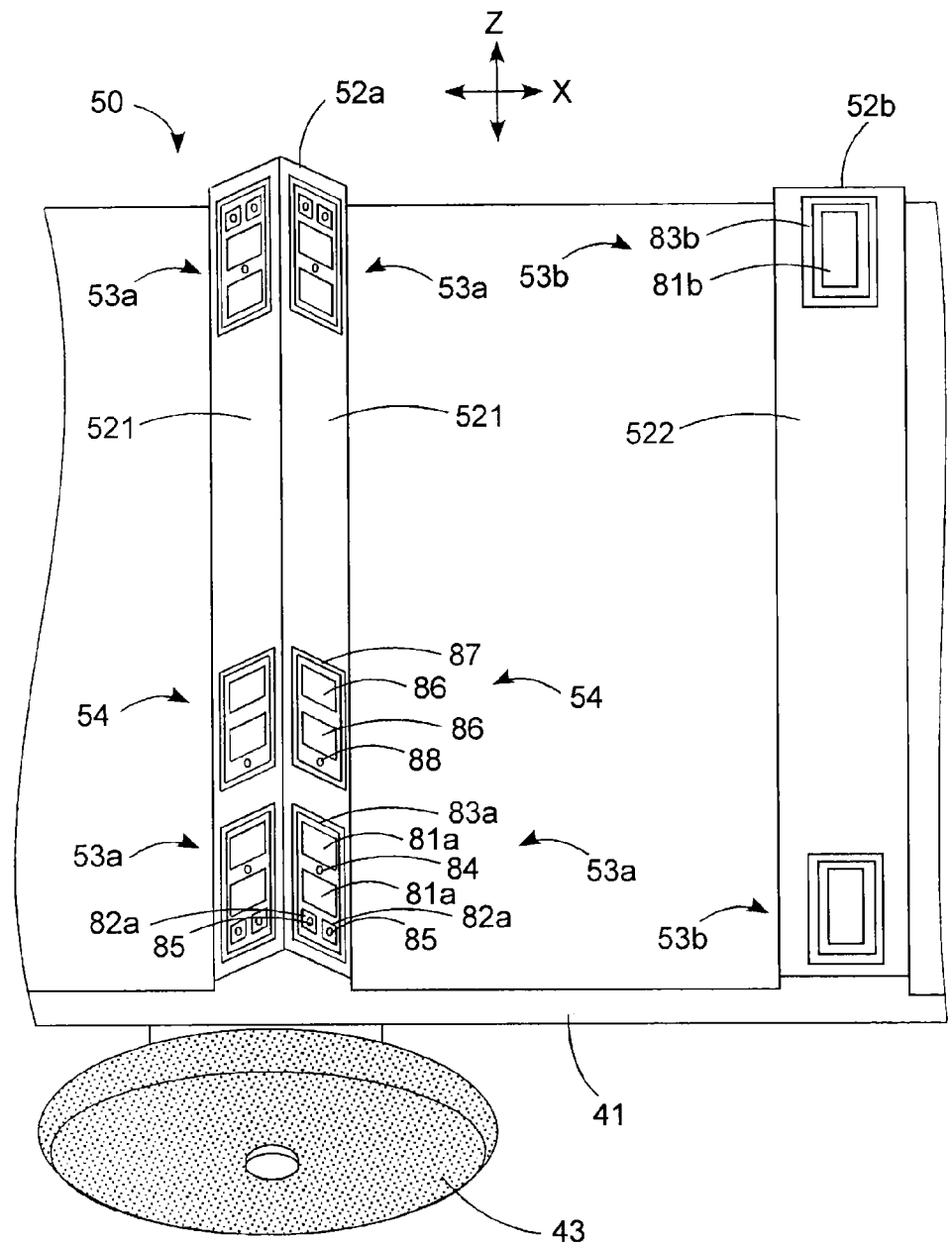
FIG. 3 is a perspective view showing the hydrostatic fluid guide device seen from a reverse side thereof.

As shown in FIGS. 2 and 3, the hydrostatic fluid guide device 50 includes the V slider 52a as the movable body, the V guide rail 51a for a grinding wheel head as the support, hydrostatic fluid guide mechanisms 53a provided at the V slider 52a to guide linear movement of the V slider 52a, a damping mechanism 54 provided at the V slider 52a to damp the vibration generated at the V slider 52a, and the like.

As shown in FIG. 3, the hydrostatic fluid guide mechanisms 53a are respectively provided on the two sliding surfaces 521 of the V slider 52a. In this example, the hydrostatic fluid guide mechanisms 53a are provided at respective ends of each sliding surface 521. The damping mechanism 54 is provided in the vicinity of one hydrostatic fluid guide mechanism 53a in each sliding surface 521.

The hydrostatic fluid guide mechanism 53a includes two rectangular land portions 81a formed so as to protrude toward the V guide rail 51a for a grinding wheel head, two land portions 82a smaller than the land portions 81a, and a frame portion 83a formed so as to surround the four land portions 81a and 82a and protrude toward the V guide rail 51a for a grinding wheel head. The two land portions 81a are arranged at a predetermined interval in the Z-axis direction, and a supply port 84 to which oil is supplied is bored between the two land portions 81a. The two land portions 82a are arranged at a predetermined interval in the X-axis direction, and discharge ports 85 through which oil is discharged are respectively bored at the centers of the two land portion 82a.

The damping mechanism 54 includes two rectangular land portions 86 formed so as to protrude toward the V guide rail 51a for a grinding wheel head, and a frame portion 87 formed so as to surround the two land portions 86 and to protrude toward the V guide rail 51a for a grinding wheel head. The two land portions 86 are arranged at a predetermined interval in the Z-axis direction, and a supply port 88 to which oil is supplied is bored between one land portion 86 and the frame portion 87.

Hydrostatic fluid guide mechanisms 53b with a configuration different from the configuration of the hydrostatic fluid guide mechanisms 53a are provided at respective ends of the sliding surface 522 of the flat slider 52b. The hydrostatic fluid guide mechanism 53b includes a rectangular land portion 81b formed so as to protrude toward the flat guide rail 51b for a grinding wheel head, and a frame portion 83b formed so as to surround the land portion 81b and protrude toward the flat guide rail 51b for a grinding wheel head.

As described above, by supplying low-viscosity oil to the hydrostatic fluid guide mechanisms, power consumption during the linear movement of the movable body can be reduced, but the damping performance against the vibration of the movable body deteriorates. Thus, as described above, in the hydrostatic fluid guide device 50 of the present embodiment, the hydrostatic fluid guide mechanisms 53a and the damping mechanisms 54 are provided. Therefore, the damping performance against the vibration of the grinding wheel supporting device 40 can be enhanced, and power required during the movement of the grinding wheel supporting device 40 can be reduced.

That is, the hydrostatic fluid guide device 50 has the function of bringing the sliding surfaces 521 of the V slider 52a and the V-shaped groove 511 of the V guide rail 51a for a grinding wheel head into a non-contact state by virtue of the squeeze effect when oil is squeezed between the land portions 81a of the hydrostatic fluid guide mechanisms 53a and the V-shaped groove 511 of the V guide rail 51a for a grinding wheel head and is caused to flow to the outside, and thus obtaining rigidity for load support during the movement of the V slider 52a on the V guide rail 51a for a grinding wheel head. Thus, it is possible to enhance the rigidity for load support.

Moreover, the hydrostatic fluid guide device 50 has the function of obtaining the damping performance against the vibration during the movement of the V slider 52a on the V guide rail 51a for a grinding wheel head, by virtue of the squeeze effect when oil is squeezed between the land portions 86 of the damping mechanisms 54 and the V-shaped groove 511 of the V guide rail 51a for a grinding wheel head and is caused to flow to the outside. Thus, it is possible to suppress the rotation of the V slider 52a around the Y-axis caused during the movement of the V slider 52a.

However, if the oil within the hydrostatic fluid guide mechanisms 53a is not discharged efficiently, the oil pressure within the hydrostatic fluid guide mechanisms 53a may rise. As a result, positional deviation may occur in the grinding wheel supporting device 40. Thus, in the hydrostatic fluid guide device 50 of the present embodiment, a path for discharging the oil within the hydrostatic fluid guide mechanisms 53a to the outside is provided, and a path for internally circulating the oil to the damping mechanisms 54 is provided.

On the other hand, if the oil pressure within the damping mechanisms 54 rises, the oil pressure within the hydrostatic fluid guide mechanisms 53a may decrease the rigidity for load support during the movement of the grinding wheel supporting device 40 may deviate from a design value, and positional deviation may occur in the grinding wheel supporting device 40. Thus, in the hydrostatic fluid guide device 50 of the present embodiment, a path, through which oil is supplied by the hydrostatic pressure caused by natural fall instead of being pressurized and supplied by a pump or the like, is provided, unlike the related art. The paths of oil for the hydrostatic fluid guide device 50 will be described below.

In the paths of oil for the hydrostatic fluid guide device 50 in a first form, as shown in FIGS. 4A and 4B, an oil reservoir 91 that stores oil Y discharged from the hydrostatic fluid guide device 50 and the like, and a pump 92 that pressurizes the oil Y from the oil reservoir 91 and supplies the oil Y to the hydrostatic fluid guide device 50 and the like are provided within the bed 10 below the grinding wheel supporting device 40. An oil collecting portion 93 is provided between the X-axis guide rails 41a and 41b for a grinding wheel head on the grinding wheel head traverse base 41. The oil collecting portion 93 discharges the oil Y to the oil reservoir 91 and the like after collecting the oil Y discharged from the sliding surfaces 42a and 42b (corresponding to "guide surfaces" of the invention) and the like of the grinding wheel head 42, the sliding surfaces 42a and 42b being opposed to the X-axis guide rails 41a and 41b for a grinding wheel head.

An oil supply passage 94 that extends from the oil reservoir 91 and communicates with the supply port 84 of each hydrostatic fluid guide mechanism 53a is provided inside the grinding wheel head traverse base 41 and the V slider 52a. Inside the V slider 52a, oil discharge passages 95 that extend from the discharge ports 85 of the hydrostatic fluid guide mechanisms 53a to the outside of the V slider 52a and communicate with the oil reservoir 91 are provided, and further, an oil supply passage 96 that extends from the discharge ports 85 of the hydrostatic fluid guide mechanisms 53a and communicates with the supply ports 88 of the damping mechanisms 54 is provided.

Figure 5A:
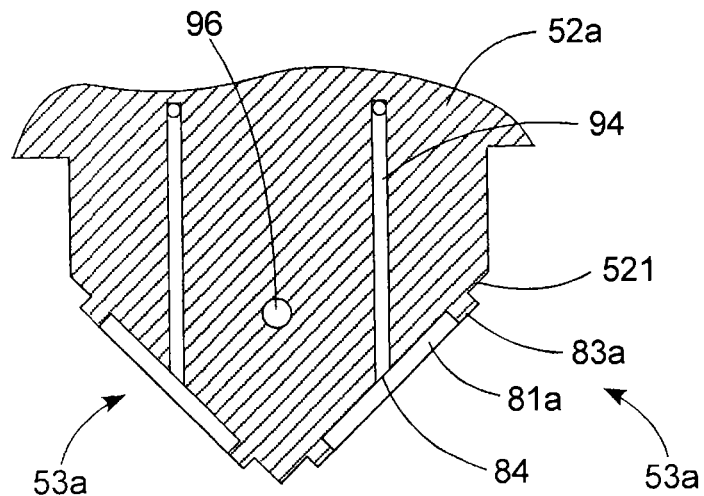
FIG. 5A is a sectional view taken along a line V(A)-V(A) in FIG. 4B, FIG. 5A showing a supply passage through which oil is supplied to the hydrostatic fluid guide mechanism.

That is, as shown in FIGS. 4A, 4B, and 5A, the oil supply passage 94 is provided so that the oil supply passage 94 extends in the Z-axis direction from one end face of the V slider 52a and is bent to extend downward in the Y-axis direction at a position above the supply port 84 of each hydrostatic fluid guide mechanism 53a so as to communicate with the supply port 84.

Figure 5B:
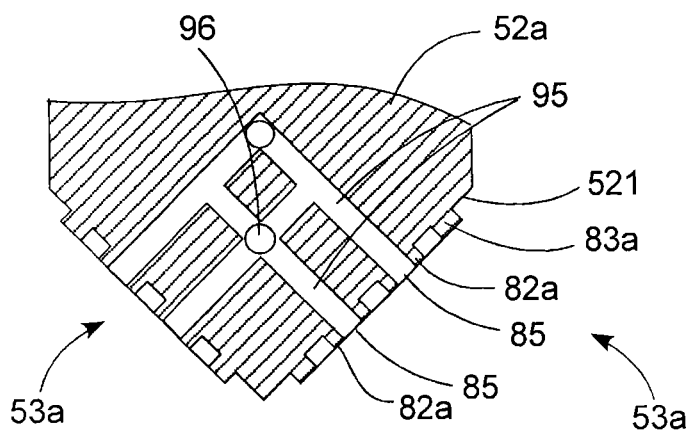
FIG. 5B is a sectional view taken along a line V(B)-V(B) in FIG. 4B, FIG. 5B showing a discharge passage through which the oil is discharged from the hydrostatic fluid guide mechanism.

As shown in FIGS. 4A, 4B, and 5B, the oil discharge passages 95 are provided so that the oil discharge passages 95 extend obliquely upward at 45° from the discharge ports 85 of the hydrostatic fluid guide mechanisms 53a, and are bent to extend in the Z-axis direction toward the end faces of the V slider 52a so as to communicate with the end faces of the V slider 52a.

Figure 5C:
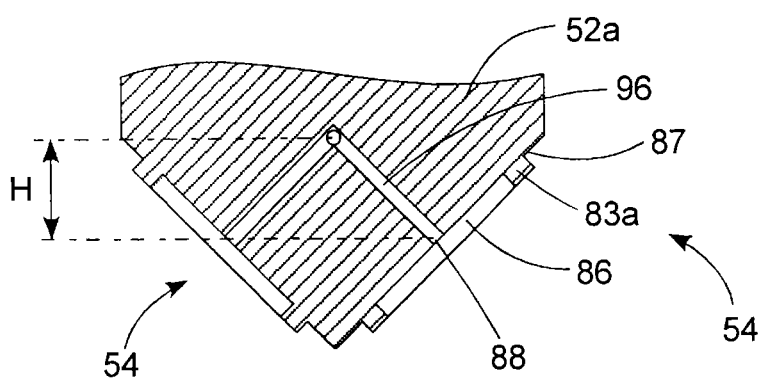
FIG. 5C is a sectional view taken along a line V(C)-V(C) in FIG. 4B, FIG. 5C showing a supply passage through which the oil is supplied to the damping mechanism.

As shown in FIGS. 4A, 4B, and 5C, the oil supply passage 96 is provided so that the oil supply passage 96 extends in the Z-axis direction from a portion of the oil discharge passage 95 for the adjacent hydrostatic fluid guide mechanism 53a (i.e., a portion extending upward in the Y-axis direction), and is bent to extend obliquely downward at 45° at a position above the supply port 88 of each damping mechanism 54 so as to communicate with the supply port 88.

As described above, since the oil discharge passage 95 and the oil supply passage 96 communicate with the discharge ports 85 bored in the land portions 82a that squeeze the oil Y, the oil Y within the hydrostatic fluid guide mechanism 53a is efficiently discharged through the oil discharge passage 95 and the oil Y is efficiently and internally circulated to the damping mechanism 54 through the oil supply passage 96. Hence, it is possible to suppress a rise in oil pressure within the hydrostatic fluid guide mechanism 53a, and to position the grinding wheel supporting device 40 with high accuracy. Moreover, since the oil Y to be supplied to the damping mechanism 54 is internally circulated, it is possible to prevent entrapment of air, and to ensure high damping performance against the vibration of the grinding wheel supporting device 40.

The pressure of the oil Y supplied to each damping mechanism 54 is a hydrostatic pressure corresponding to height H between the portion of the oil supply passage 96 extending in the Z-axis direction and the supply port 88 of the damping mechanism 54. Further, since the oil supply passage 96 branches from the corresponding oil discharge passage 95 that communicates with the outside of the V slider 52a, the oil supply passage 96 is open to the atmosphere. Hence, it is possible to suppress a rise in oil pressure within the damping mechanism 54 caused by the extra oil Y, and to suppress a decrease in oil pressure within the hydrostatic fluid guide mechanism 53a. Accordingly, it is possible to position the grinding wheel supporting device 40 with high accuracy by setting the rigidity for load support during the movement of the grinding wheel supporting device 40 to a value substantially equal to a design value.

Figure 6A:
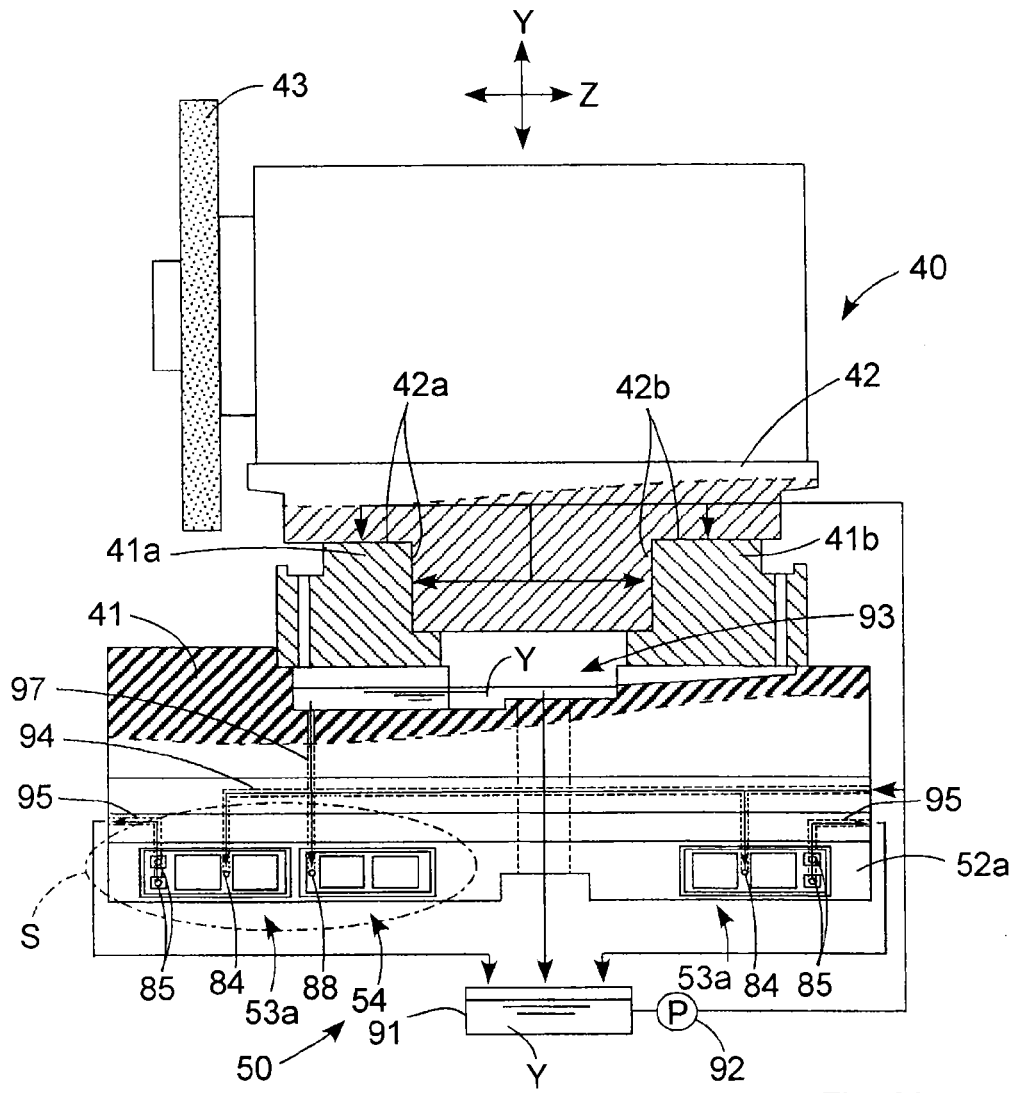
FIG. 6A is a partial sectional side view showing paths of oil for the grinding wheel supporting device and the hydrostatic fluid guide device in a second form.
Figure 6B:
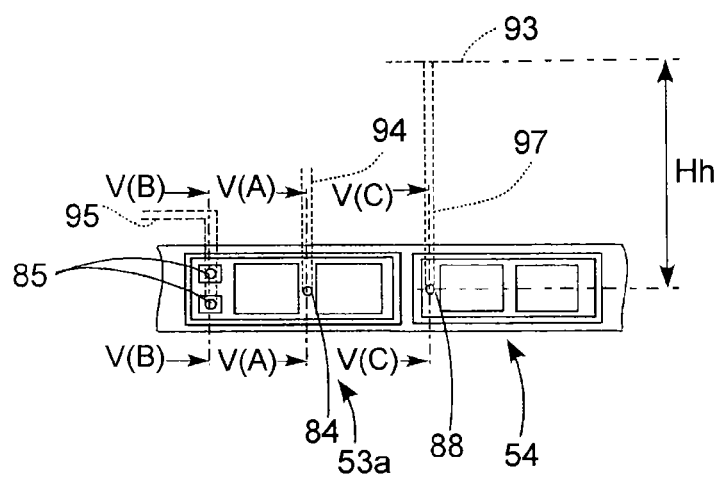
FIG. 6B is a view showing a portion of the hydrostatic fluid guide mechanism and the damping mechanism, the portion being indicated by S in FIG. 6A.

The paths of oil for the hydrostatic fluid guide device 50 in a second form will be made with reference to FIGS. 6A and 6B corresponding to FIG. 4A and FIG. 4B. The same members as the members of the grinding wheel supporting device 40 and the hydrostatic fluid guide device 50 shown in FIGS. 4A and 4B will be designated by the same reference numerals, and the descriptions thereof will be omitted. As shown in FIGS. 6A and 6B, the pump 92 is provided so that the oil Y within the oil reservoir 91 can be pressurized and supplied to the hydrostatic fluid guide device 50 and the like, and can be pressurized and supplied to the grinding wheel supporting device 40. The oil collecting portion 93 is provided so that the collected oil Y can be discharged to the oil reservoir 91 and can be supplied to the supply port 88 of the damping mechanism 54.

Figure 7A:
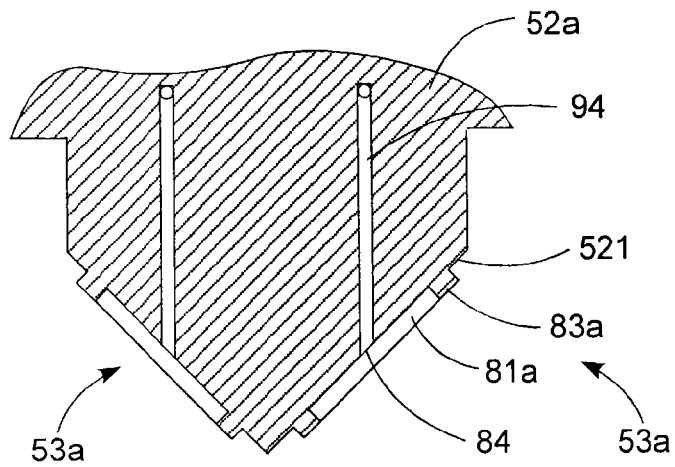
FIG. 7A is a sectional view taken along a line V(A)-V(A) in FIG. 6B, FIG. 7A showing a supply passage through which the oil is supplied to the hydrostatic fluid guide mechanism.
Figure 7B:
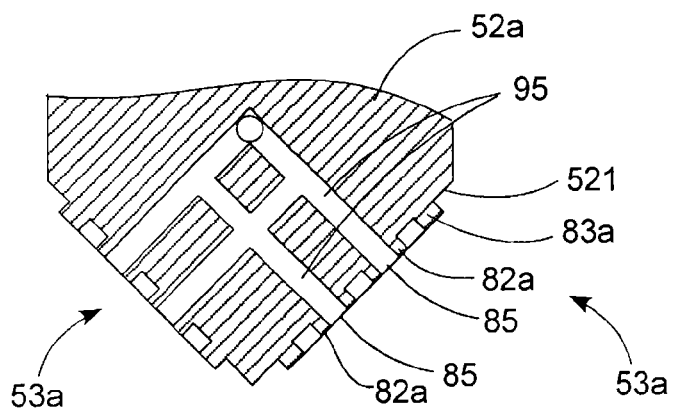
FIG. 7B is a sectional view taken along a line V(B)-V(B) in FIG. 6B, FIG. 7B showing a discharge passage through which the oil is discharged from the hydrostatic fluid guide mechanism.
Figure 7C:
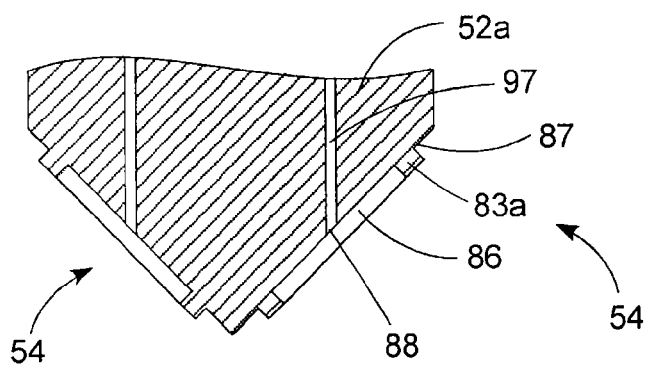
FIG. 7C is a sectional view taken along a line V(C)-V(C) in FIG. 6B, FIG. 7C showing a supply passage through which the oil is supplied to the damping mechanism.

Hence, the oil supply passage 96 branching from the corresponding oil discharge passage 95 in the first form is not provided, and an oil supply passage 97 extending from the oil collecting portion 93 and communicating with the supply port 88 of the damping mechanism 54 is provided. That is, as shown in FIGS. 6A, 6B, and 7C, the oil supply passage 97 is provided so as to extend downward in the Y-axis direction from the oil collecting portion 93 and to communicate with the supply port 88. The pressure of the oil Y supplied to the damping mechanism 54 is a hydrostatic pressure corresponding to height Hh between the oil collecting portion 93 and the supply port 88 of the damping mechanism 54. In the hydrostatic fluid guide device 50 including the paths of oil in the second form as well, it is possible to obtain the same effects as those obtained in the hydrostatic fluid guide device 50 including the paths of oil in the first form. The oil supply passage 97 supplies the oil Y used in and collected from the sliding surfaces 42a and 42b of the grinding wheel head 42, the sliding surfaces 42a and 42b being opposed to the X-axis guide rails 41a and 41b for a grinding wheel head. Therefore, the amount of consumed oil can be reduced.

In the hydrostatic fluid guide device 50 including the paths of oil in the above-described first form, the oil Y is supplied to the hydrostatic fluid guide mechanisms 53a and then the oil Y is discharged from the hydrostatic fluid guide mechanisms 53a and supplied to the damping mechanisms 54. However, the hydrostatic fluid guide device may have a configuration in which the oil Y is supplied to the hydrostatic fluid guide mechanisms, and then the oil Y is supplied from the hydrostatic fluid guide mechanisms to the damping mechanisms, and then discharged from the damping mechanisms.

Figure 8A:
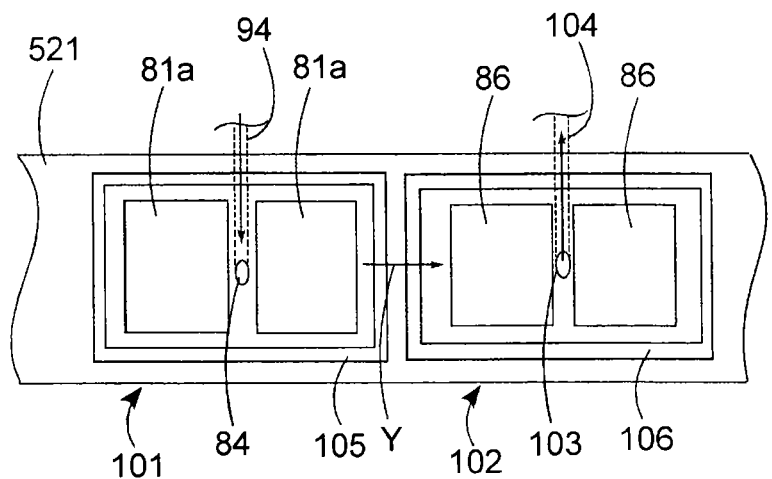
FIG. 8A is a view showing the hydrostatic fluid guide mechanism and the damping mechanism in another form.

An example of this configuration will be described with reference to FIG. 8A. In a hydrostatic fluid guide mechanism 101 and a damping mechanism 102 shown in FIG. 8A, the same members as the members of the hydrostatic fluid guide mechanism 53a and the damping mechanism 54 shown in FIG. 3 will be designated by the same reference numerals. In the hydrostatic fluid guide mechanism 101, the two small land portions 82a and the discharge ports 85, which are provided within the above-described hydrostatic fluid guide mechanism 53a, are not provided. In the damping mechanism 102, the supply port 88, which is provided in the above-described damping mechanism 54, is not provided, and instead, a discharge port 103 is provided. Also, an oil discharge passage 104 that communicates with the discharge port 103 and is open to the atmosphere is provided. In this configuration, the oil Y can be internally circulated and supplied from the inside of a frame portion 105 that stores the oil of the hydrostatic fluid guide mechanism 101, into a frame portion 106 that stores the oil of the damping mechanism 102. Therefore, it is possible to suppress a rise in oil pressure within the hydrostatic fluid guide mechanism 101, and to position the grinding wheel supporting device 40 with high accuracy.

Figure 8B:
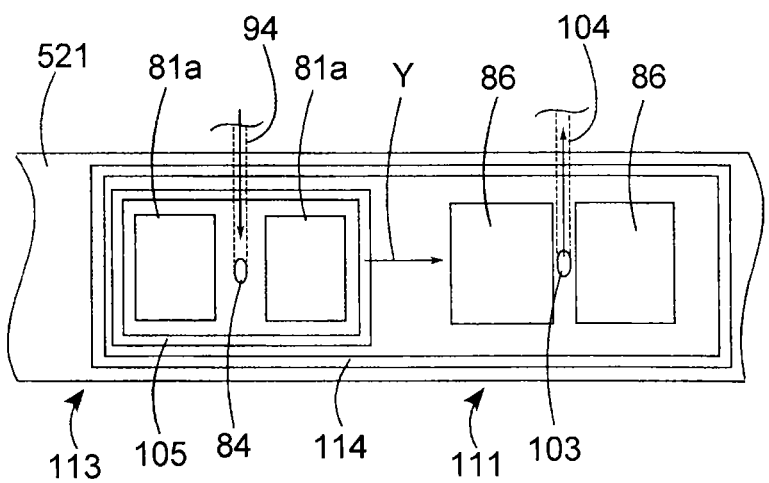
FIG. 8B is a view showing the hydrostatic fluid guide mechanism and the damping mechanism in yet another form.

Another example will be described with reference to FIG. 8B corresponding to FIG. 8A. As shown in FIG. 8B, in a damping mechanism 111, the frame portion 106 shown in FIG. 8A is not provided, and a frame portion 114 surrounding a hydrostatic fluid guide mechanism 113 and the damping mechanism 111 is provided. In this configuration as well, the oil Y can be internally circulated and supplied from the inside of the frame portion 105 that stores the oil of the hydrostatic fluid guide mechanism 113, into the damping mechanism 111. Therefore, it is possible to suppress a rise in oil pressure within the hydrostatic fluid guide mechanism 113, and to position the grinding wheel supporting device 40 with high accuracy.

Figure 9:
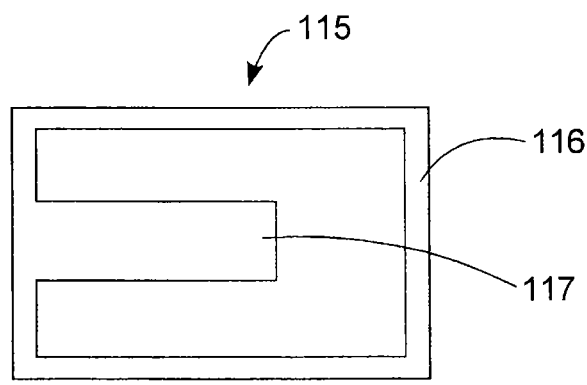
FIG. 9 is a view showing a flame portion and a land portion in another form in each of the hydrostatic fluid guide mechanism and the damping mechanism.

In the above-described embodiments, in each damping mechanism 54 or 102, the frame portion 87 or 106 and the land portions 86 are provided as separate bodies with a groove interposed therebetween. However, as shown in FIG. 9, in a damping mechanism 115, a frame portion 116 and a land portion 117 may be provided so as to be partially integrated.

The hydrostatic fluid guide mechanism 53a, 101, or 113 and the damping mechanism 54, 102, or 111 are provided in each sliding surface 521 of the V slider 52a. However, the hydrostatic fluid guide mechanism 53a, 101, or 113 and the damping mechanism 54, 102, or 111 may be provided in one sliding surface 521.

The number of the land portions 81a, 82a, or 86 provided in each of the hydrostatic fluid guide mechanisms 53a, 101, and 113, and the damping mechanism 54, 102, and 111 may be arbitrary. However, when only one large land is provided, it is necessary to set the size of the land so that the position of the V slider 52a is not shifted upward.

Although the case where the hydrostatic fluid guide device 50 is applied to the two-surface constraint guide supporting device in the grinding machine 1 has been described, the hydrostatic fluid guide device may be applied to a four-surface constraint guide supporting device or a six-surface constraint guide supporting device. Further, the machine, to which the hydrostatic fluid guide device 50 is applied, is not limited to the grinding machine 1. The hydrostatic fluid guide device 50 may be applied to any machine including the guide supporting device.

What is claimed is:

1. A hydrostatic fluid guide device comprising:
   a movable body;
   a support that supports the movable body so that the movable body is linearly movable;
   a hydrostatic fluid guide mechanism that is provided in the movable body and that guides linear movement of the movable body; and
   a damping mechanism that is provided in the movable body, and that damps vibration caused in the movable body,
   wherein a pressure of a fluid supplied to the damping mechanism is a hydrostatic pressure, and
   wherein the hydrostatic fluid guide mechanism includes a land portion formed to protrude toward the support and a frame portion formed to protrude toward the support and to surround the land portion.

2. The hydrostatic fluid guide device according to claim 1, wherein a supply passage, through which the fluid is supplied to the damping mechanism, is open to atmosphere.

3. The hydrostatic fluid guide device according to claim 1, wherein a discharge passage, through which the fluid supplied to the damping mechanism is discharged, is opened to atmosphere.

4. The hydrostatic fluid guide device according to claim 2, wherein the fluid supplied to the hydrostatic fluid guide mechanism is internally circulated and supplied to the damping mechanism through the supply passage.

5. The hydrostatic fluid guide device according to claim 4, wherein the fluid is internally circulated from the land portion and supplied to the damping mechanism, through the supply passage.

6. The hydrostatic fluid guide device according to claim 4, wherein the fluid is internally circulated from the frame portion and supplied to the damping mechanism, through the supply passage.

7. The hydrostatic fluid guide device according to claim 4, wherein the fluid used in and collected from a guide surface provided at an upper portion of the movable body is supplied through the supply passage.

8. The hydrostatic fluid guide device according to claim 1, wherein the fluid is internally circulated from the frame portion and supplied to the damping mechanism, through the supply passage.

9. The hydrostatic fluid guide device according to claim 1, wherein the hydrostatic fluid guide mechanism is at an end of movable body on a sliding surface of the movable body and the damping mechanism is on the sliding surface adjacent to the hydrostatic fluid guide mechanism.

\* \* \* \* \*